US008817676B2

(12) United States Patent
Shao et al.

(10) Patent No.: US 8,817,676 B2
(45) Date of Patent: Aug. 26, 2014

(54) METHOD AND SYSTEM FOR STATION-TO-STATION DIRECTIONAL WIRELESS COMMUNICATION

(75) Inventors: Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 513 days.

(21) Appl. No.: 12/541,096

(22) Filed: Aug. 13, 2009

(65) Prior Publication Data
US 2010/0110981 A1 May 6, 2010

Related U.S. Application Data

(60) Provisional application No. 61/110,839, filed on Nov. 3, 2008.

(51) Int. Cl.
*H04W 72/04* (2009.01)
*H04B 7/06* (2006.01)

(52) U.S. Cl.
CPC ........... *H04W 72/046* (2013.01); *H04B 7/0695* (2013.01)
USPC ....................................................... 370/310

(58) Field of Classification Search
USPC ................. 370/230, 448; 342/367; 455/41.2; 714/783
See application file for complete search history.

(56) References Cited

U.S. PATENT DOCUMENTS

| | | | |
|---|---|---|---|
| 5,596,333 A | 1/1997 | Bruckert | |
| 5,924,020 A | 7/1999 | Forssen et al. | |
| 6,414,955 B1 | 7/2002 | Clare et al. | |
| 6,515,976 B1 * | 2/2003 | Dent et al. | 370/336 |
| 6,954,449 B2 | 10/2005 | Cain et al. | |
| 6,985,498 B2 | 1/2006 | Laroia et al. | |
| 7,027,409 B2 | 4/2006 | Cain | |
| 7,043,274 B2 | 5/2006 | Cuffaro | |
| 7,085,541 B2 | 8/2006 | Redi et al. | |
| 7,272,126 B2 | 9/2007 | Soltanian et al. | |
| 7,304,972 B2 | 12/2007 | Cain et al. | |
| 7,333,458 B2 | 2/2008 | Cain | |
| 7,356,010 B2 | 4/2008 | He et al. | |
| 7,400,899 B2 | 7/2008 | Shin et al. | |
| 7,420,944 B2 | 9/2008 | Norris et al. | |
| 7,453,832 B2 | 11/2008 | Steer et al. | |
| 7,471,667 B2 | 12/2008 | Hirsch et al. | |
| 7,489,650 B2 | 2/2009 | Ginzburg et al. | |
| 7,515,577 B2 | 4/2009 | Pandey et al. | |
| 7,551,135 B2 | 6/2009 | Uno et al. | |
| 7,630,343 B2 | 12/2009 | Zhu et al. | |

(Continued)

OTHER PUBLICATIONS

Harada et al. "Unified and flexible millimeter wave WPAN systems supported by common mode", IEEE 802.15-07-0761-10-003c, Sep. 18, 2007.*

(Continued)

*Primary Examiner* — Joseph Bednash
(74) *Attorney, Agent, or Firm* — Kenneth L. Sherman, Esq.; Michael Zarrabian, Esq.; Sherman & Zarrabian LLP

(57) ABSTRACT

Method and system for directional wireless communication, is provided. One implementation involves directionally transmitting a request for access to a shared wireless communication medium, for directional communication between two wireless stations, and receiving a broadcast response indicating a time period during which the wireless stations may perform directional communication therebetween via the wireless communication medium by setting their antenna directions to each other.

40 Claims, 10 Drawing Sheets

(56) References Cited

U.S. PATENT DOCUMENTS

| | | | |
|---|---|---|---|
| 7,664,054 B2 | 2/2010 | Adya et al. | |
| 7,684,333 B1 | 3/2010 | Dasylva et al. | |
| 7,729,321 B2 | 6/2010 | Liu | |
| 7,783,258 B2 | 8/2010 | Bevan et al. | |
| 7,804,804 B2 | 9/2010 | Sugaya et al. | |
| 7,826,431 B2 | 11/2010 | Cave et al. | |
| 8,054,223 B2 * | 11/2011 | Lakkis | 342/367 |
| 8,081,110 B2 * | 12/2011 | Lakkis | 342/367 |
| 8,095,069 B2 * | 1/2012 | Maltsev et al. | 455/41.2 |
| 8,234,552 B2 * | 7/2012 | Lakkis | 714/783 |
| 2002/0044549 A1 | 4/2002 | Johansson et al. | |
| 2002/0183095 A1 | 12/2002 | Aoyama et al. | |
| 2004/0141511 A1 | 7/2004 | Rune et al. | |
| 2006/0050728 A1 * | 3/2006 | Sung et al. | 370/448 |
| 2006/0067280 A1 | 3/2006 | Howard et al. | |
| 2006/0209876 A1 | 9/2006 | Liu et al. | |
| 2006/0227740 A1 | 10/2006 | McLaughlin et al. | |
| 2007/0115817 A1 * | 5/2007 | Gupta et al. | 370/230 |
| 2007/0287384 A1 | 12/2007 | Sadri et al. | |
| 2007/0297365 A1 | 12/2007 | Li et al. | |
| 2008/0026797 A1 | 1/2008 | Nanda et al. | |
| 2008/0112375 A1 | 5/2008 | Bennett | |
| 2009/0016285 A1 | 1/2009 | Li et al. | |
| 2009/0046653 A1 | 2/2009 | Singh et al. | |
| 2009/0052389 A1 | 2/2009 | Qin et al. | |
| 2009/0109938 A1 | 4/2009 | Singh et al. | |
| 2009/0125792 A1 | 5/2009 | Lakkis | |
| 2009/0160707 A1 * | 6/2009 | Lakkis | 342/367 |
| 2009/0279525 A1 * | 11/2009 | Lakkis | 370/338 |
| 2009/0323611 A1 | 12/2009 | Singh et al. | |
| 2010/0014489 A1 | 1/2010 | Qin et al. | |
| 2010/0091919 A1 | 4/2010 | Xu et al. | |
| 2010/0111006 A1 | 5/2010 | Zhai et al. | |
| 2010/0118835 A1 | 5/2010 | Lakkis et al. | |
| 2010/0142445 A1 | 6/2010 | Schlicht et al. | |
| 2010/0142460 A1 | 6/2010 | Zhai et al. | |
| 2010/0172296 A1 | 7/2010 | Singh et al. | |
| 2010/0177719 A1 | 7/2010 | Shao et al. | |
| 2011/0064072 A1 | 3/2011 | Wang et al. | |
| 2013/0128839 A1 | 5/2013 | Shao et al. | |

OTHER PUBLICATIONS

IEEE Std 802.15.3-2003, IEEE, Jun. 12, 2003.*

Harada et al. "Merged Proposal: New PHY Layer Enhancement of MAC for mmWave System Proposal", IEEE 802.15-07-0934-01-003c, Nov. 13, 2007.*

Sadri et al. "60 GHz WPAN Framework and Gaps of merged proposals", IEEE 802.15-924, Nov. 14, 2007.*

U.S. Appl. No. 60/985,957, filed Dec. 2007, Lakkis, Ismail.*

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

Lakkis, I et al., "TG3c Call for Proposals", IEEE P802.15 Working Group for Wireless Personal Area Networks (WPANs), 15-08-0355-00-003c, May 14, 2008, pp. 37-41, Chapter 2, United States.

Harada, H. et al., "Unified and Flexible Millimeter Wave WPAN Systems Supported by Common Mode (IEEE 802.15-07-0761-00-003c)", IEEE, Jul. 9, 2007, pp. 1-46, United States.

Harada, H. et al., "Unified and Flexible Millimeter Wave WPAN Systems Supported by Common Mode (IEEE 802.15-07-0761-10-003c)", IEEE, Sep. 18, 2007, pp. 1-62, United States.

IEEE Computer Society, "IEEE Std 802.15.3™-2003 IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)", IEEE, Sep. 29, 2003, pp. i-315, New York, United States.

IEEE, "IEEE Wireless LAN Edition, A Compilation Based on IEEE Std 802.11™-1999 (R2003) and Its Amendments", IEEE, 2003, pp. i-678, New York, United States.

International Preliminary Report on Patentability dated Feb. 24, 2010 for International Application No. PCT/KR2008/004793, filed Aug. 19, 2008, from International Bureau, pp. 1-5, Geneva, Switzerland.

International Search Report dated Jan. 9, 2009 for International Application No. PCT/KR2008/004793, filed Aug. 19, 2008, from Korean Intellectual Property Office, pp. 1-10, Seo-gu, Daejeon, Republic of Korea.

U.S. Non-Final Office Action for U.S. Appl. No. 12/188,534 mailed Sep. 5, 2012.

U.S. Notice of Allowance for U.S. Appl. No. 12/628,792 mailed Oct. 4, 2012.

U.S. Final Office Action for U.S. Appl. No. 12/189,534 mailed Jan. 31, 2013.

* cited by examiner

METHOD AND SYSTEM FOR STATION-TO-STATION DIRECTIONAL WIRELESS COMMUNICATION

RELATED APPLICATION

This application claims priority from U.S. Provisional Patent Application Ser. No. 61/110,839 filed Nov. 3, 2008, incorporated herein by reference.

FIELD OF THE INVENTION

The present invention relates generally to wireless communications, and in particular, to directional transmissions in wireless networks.

BACKGROUND OF THE INVENTION

A typical wireless network includes multiple wireless stations (wireless devices) communicating wirelessly via wireless media such as one or more radio frequency (RF) wireless channels. Some data applications such as web surfing and e-mail exchange usually require very random wireless channel access with bursty traffic characteristics. In wireless networks with directional transmission, such as in beamforming systems, reserving channel time in advance for these types of data applications leads to low efficiency. Further, it is difficult for two wireless stations to use the same period to communicate with each other since they do not know when to switch their antenna directions to point to each other.

BRIEF SUMMARY OF THE INVENTION

Method and system for directional wireless communication, is provided. One implementation involves directionally transmitting a request for access to a shared wireless communication medium, such as wireless radio frequency (RF) channel, for directional communication between two wireless stations, and receiving a broadcast response indicating a period in which the wireless stations may perform directional communication therebetween via the wireless communication medium by setting their antenna directions to each other.

Receiving a broadcast response may further comprise receiving a broadcast response indicating that in a contention-based access period (CAP) the wireless stations may perform directional communication therebetween via the wireless communication medium by setting their antenna directions to each other.

Directionally transmitting a request for access to the shared wireless communication medium may further comprise: selecting a contention-based access period (CAP) for access to a shared wireless channel for directional communication between the two wireless stations; organizing the CAP into multiple sub-CAPs; and during a sub-CAP in the selected CAP, a first wireless station directionally transmitting a request to a coordinator for directional communication with a second wireless station. Receiving a broadcast response may further comprise receiving a broadcast response indicating that during a next CAP the wireless stations may set their antenna directions to each other for directional communication therebetween via the wireless channel.

Time for access to the wireless channel may be organized into multiple time frames, each time frame comprising a contention-based access period (CAP). Directionally transmitting a request for directional communication with another wireless station may further comprises: during a sub-CAP in the selected CAP in a current time frame, the first wireless station directionally transmitting a request to a coordinator for directional communication with the second wireless station during a sub-CAP; and the coordinator broadcasting an information element to announce in a CAP the wireless stations may perform directional communication therebetween via the wireless communication medium by setting their antenna directions to each other.

Receiving a broadcast response may further comprise: the first and second wireless stations receiving the broadcast from the coordinator in a subsequent time frame, the broadcast including an information element indicating that in a CAP the wireless stations may set their antenna directions to each other for directional communication therebetween via the wireless channel. During a sub-CAP, the second wireless station may transmit a relinquish request to the coordinator, rejecting communication with the first wireless station.

In another embodiment, receiving a broadcast response may further comprise receiving a broadcast response indicating a contention-free period (CFP) in which the wireless stations may perform directional communication therebetween during an allocated (reserved) channel time period, via the wireless communication medium by setting their antenna directions to each other.

Channel time may further be organized into multiple time frames, each time frame comprising a reservation period including one or more allocated (reserved) channel time periods. Transmitting an allocation request for directional communication may further comprise directionally transmitting an allocation request to a coordinator for directional communication between two wireless stations during an allocated channel time period. Receiving a broadcast response may further comprise receiving a broadcast from the coordinator, the broadcast including an information element indicating that during an allocated channel time period the wireless stations may set their antenna directions to each other for directional communication therebetween via the wireless channel.

More than two wireless stations may share the channel during an allocated channel time period for directional communication through contention access or spatial re-use within the allocated channel time period. The request may indicate whether an allocated channel time period may overlap with another channel time period, wherein spatial re-use is permitted in said allocated channel time period but contention channel access is not permitted. The request may indicate whether an allocated channel time period may overlap with another channel time period wherein spatial re-use and contention channel access are permitted in said allocated channel time period. The wireless communication may comprise millimeter wave (mmW) radio frequency communication. The wireless communication may further comprise 60 GHz radio frequency communication.

These and other features, aspects and advantages of the present invention will become understood with reference to the following description, appended claims and accompanying figures.

DESCRIPTION OF THE INVENTION

Figure 1:
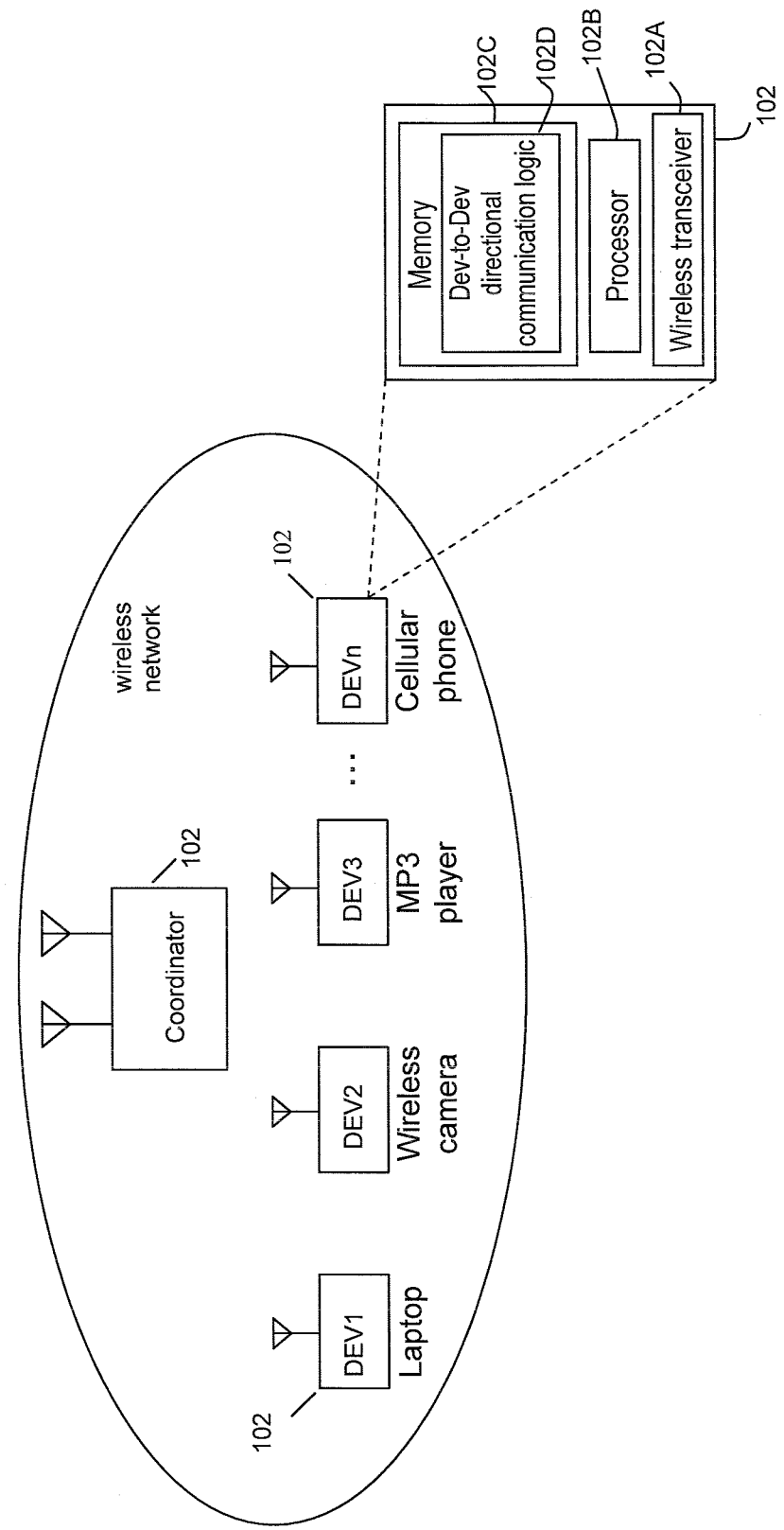
FIG. 1 shows an embodiment of a wireless system implementing device-to-device communication with directional transmission.

The present invention provides a method and system for device-to-device communication in wireless networks with directional transmission. FIG. 1 shows a block diagram of an example wireless network 100 implementing device-to-device communication with directional transmission, according to an embodiment of the present invention. The network 100 comprises multiple wireless stations 102 (e.g., n devices DEVs 102) includes a coordinator. A wireless station 102 may comprise a wireless transceiver 102A, processor 102B and memory 102C including device-to-device communication with directional transmission logic 102D, according to an embodiment of the invention. The logic 102D is described according to embodiments of the invention further below.

Figure 2:
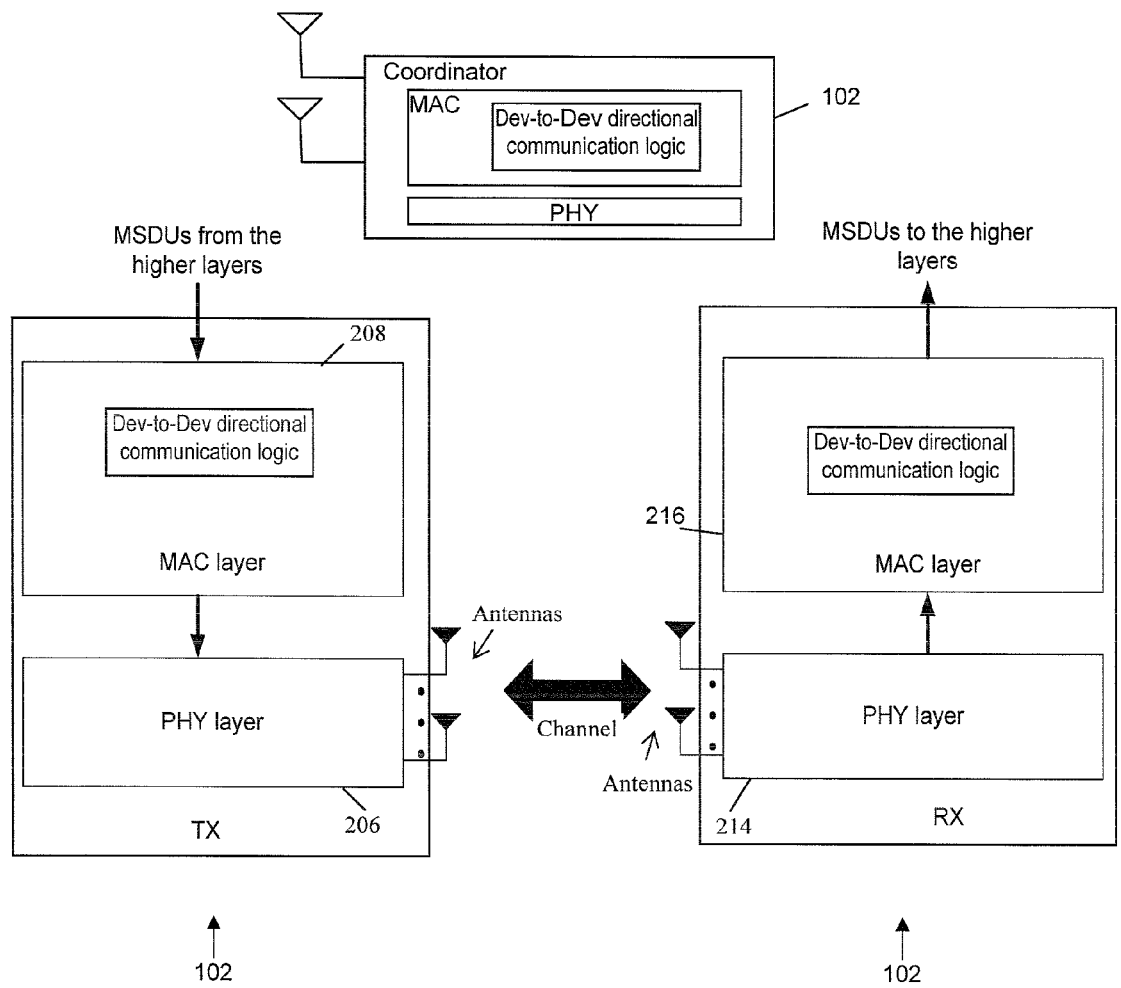
FIG. 2 shows a functional block diagram of an embodiment of a wireless system comprising a wireless transmitter (TX), a wireless receiver (RX) and a coordinator, implementing device-to-device communication with wireless directional transmission.

FIG. 2 shows plural wireless stations 102 in an example where a wireless station functions as a transmitter TX and another wireless station functions as a receiver RX. Although in the description of FIG. 2 the TX and RX have been shown separately, each is a type of wireless communication station capable of transmitting and/or receiving over a wireless channel in a wireless communication system. Therefore, a wireless communication station herein can function as a transmitter, a receiver, an initiator and/or a responder. It then follows that a coordinator can function as a transmitter, a receiver, an initiator and/or a responder.

The TX includes a physical (PHY) layer 206 and a media access control (MAC) layer 208, configured according to the invention. The RX includes a PHY layer 214 and a MAC layer 216, configured according to the invention. The TX and RX use a frame structure for data communication therebetween. Frame aggregation may be used in the MAC and PHY layers. For data communication, the TX MAC layer 208 obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to the PHY layer 206 to attach a PHY header (i.e., PHY preamble) thereto to construct a PHY Protocol Data Unit (PPDU). The PHY header includes parameters for determining a transmission scheme including a coding/modulation scheme. Before transmission as a packet from the TX to the RX, a preamble is attached to the PPDU, wherein the preamble can include channel estimation and synchronization information.

The invention is applicable to device-to-device communication in wireless networks with directional transmission. A wireless network example is millimeter wave (mmW) wireless at 60 GHz. Certain wireless networks, such as mmW wireless networks at 60 GHz frequency band, have directional transmission characteristics using sectored antenna or beam steering technology. Different standard groups such as WirelessHD, IEEE 802.15.3c and IEEE 802.11ad provide MAC/PHY standards for 60 GHz wireless. Such 60 GHz standards utilize an infrastructure operation mode in which a centralized coordinator (wireless station) is used to control and manage the wireless network.

In mmW networks such as 60 GHz networks, before two devices, or the coordinator and a device, wirelessly exchange information, they need to set their antenna directions pointing to each other.

According to an embodiment of the invention, in infrastructure operation mode, the coordinator sends out beacons omni-directionally at the beginning of each superframe. In each superframe there are contention access periods (CAPs) and reservation periods such as contention-free periods (CFPs). Beacons provide information about scheduled/allocated channel time blocks in a CFP. A bandwidth reservation scheme is applied for CFP based on the superframe structure. In each CFP there are one or more schedules, and each schedule includes one or more reserved channel time blocks for directional communication. The schedules represent allocated channel time blocks. A CAP occurs after a beacon and the invention enables two devices to communicate with each other directly by directing their antennas to each other during a CAP.

In one embodiment of the invention, generally time periods are reserved (allocated) in reservation periods (or CFPs). Such time periods are termed allocated (reserved) channel time periods, and each reservation period may include one or more allocated channel time periods.

An implementation example for IEEE 802.15.3c is described below. IEEE 802.15.3c provides a reservation period or CFP, called a channel time allocation period (CTAP) wherein an allocated channel time period is termed channel time allocation (CTA). As such, a CFP may comprise a channel time allocation period (CTAP) in IEEE 802.15.3c. Such a CTAP includes one or more times blocks such as CTAs.

Figure 3:
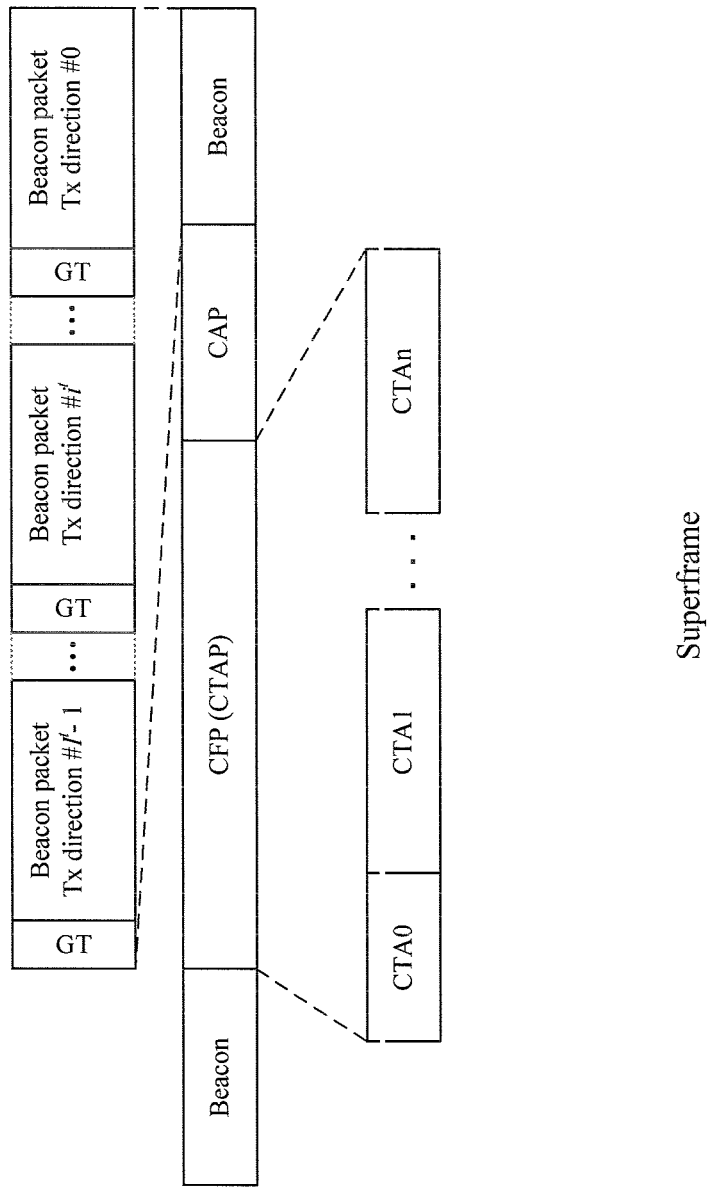
FIG. 3 shows a superframe including a contention access period (CAP) and contention-free access period (CFP), for device-to-device communication with wireless directional transmission.

As shown by the example superframe structure in FIG. 3, in one embodiment of the invention each superframe marks a channel time period between a pair of successive beacons, and includes a contention access period (CAP) and contention-free access period (CFP) such as a channel time allocation (CTA) period. Each beacon includes multiple beacon packets separate by Guard Time (GT) periods. A CFP comprises a time period in which access to the wireless communication medium is free of contention (controlled by the coordinator). To support omni-directional transmission of beacons with sectored antenna or beamforming, symbol-based or packet-based transmission repetition at different directions is used to achieve nearly omni-directional communications. Packet-based repetitions at different directions for beacons as shown in FIG. 3, is implemented. In FIG. 3, $I^t$ reflects the transmission directions of the coordinator for beacon transmission, and $i^t$ reflects the $i^{th}$ transmission direction ($0<=i^t<=I^t-1$).

At a reserved CFP (CTAP), two devices in the wireless network can train their antennas to determine the directions to point to each other. Then, at a CFP reserved for communication between two devices, the devices can switch their antenna directions to point to each other. Some data applications such as web surfing and e-mail exchange usually require very random wireless channel access with bursty traffic characteristics. Reserving a CFP in advance for these types of data applications leads to low MAC efficiency.

Figure 4:
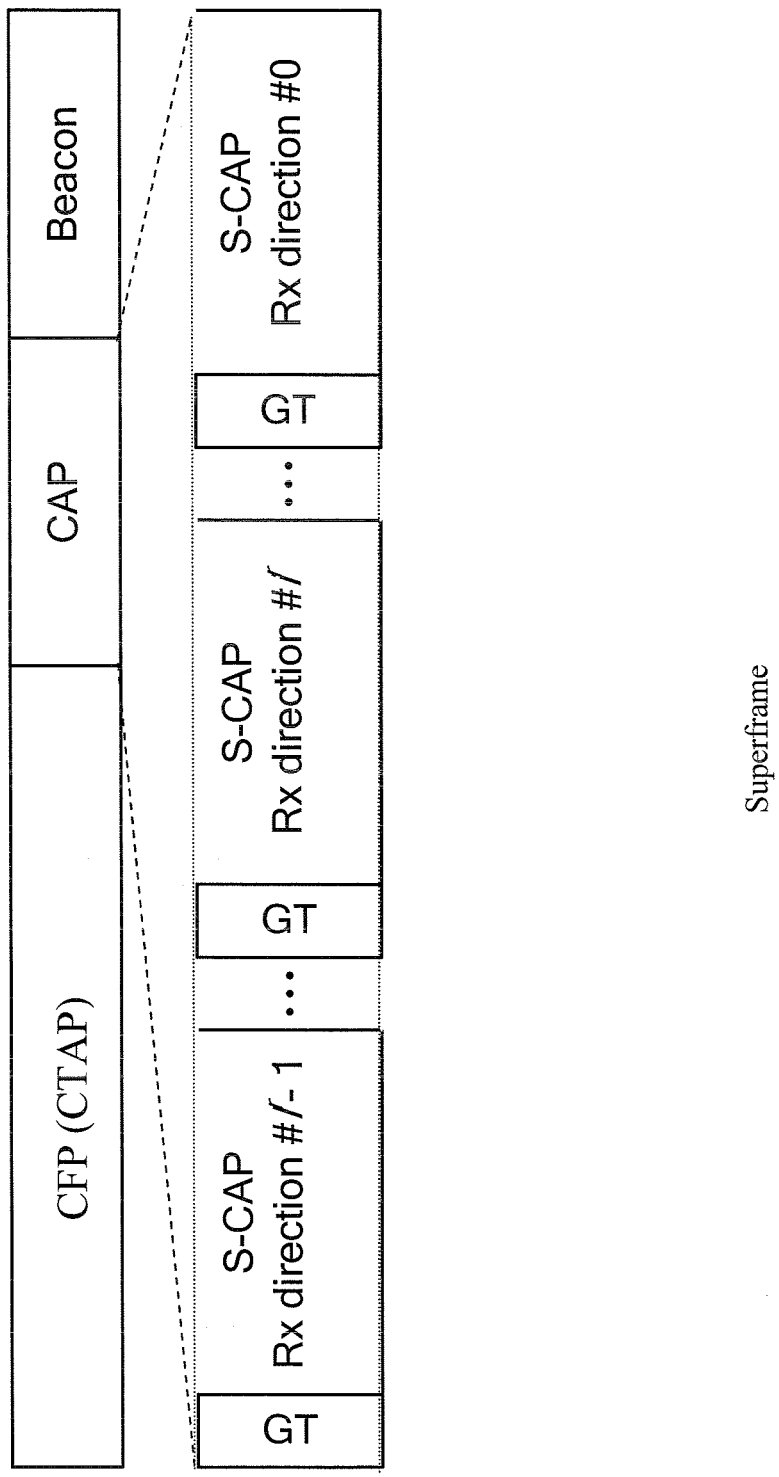
FIG. 4 shows in a superframe including a contention access period (CAP) and contention-free access period (CFP) for device-to-device communication with wireless directional transmission, the CAP is divided into multiple sub-CAPs (S-CAPs), wherein each S-CAP corresponds to a receive direction of the coordinator.

As illustrated in the superframe structure shown in FIG. 4 according to an embodiment of the invention, a CAP is divided into multiple sub-CAPs (S-CAPs) to reflect the coordinator receiving directions (for all pico-network-coordinator (PNC) receiving directions). In each S-CAP, the coordinator sets its antenna to a particular direction to receive packets from the devices whose antenna is set to point to the coordinator. Each CAP includes multiple S-CAP communication direction packets separated by Guard Time (GT) periods. In FIG. 4, I$^r$ reflects the receiving directions of the coordinator, and i$^r$ reflects the i$^{th}$ receiving direction (0<=i$^r$<=I$^r$−1).

Figure 5:
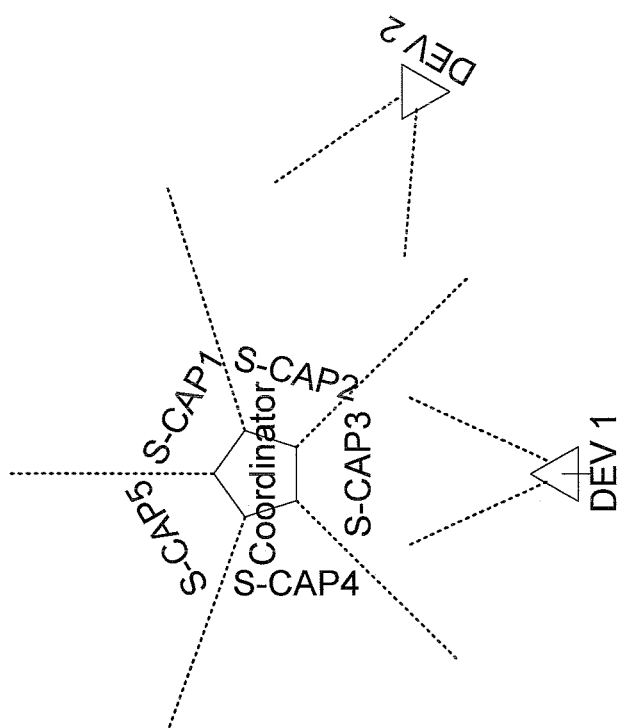
FIG. 5 shows directional communication from wireless stations to a coordinator in a CAP which may include multiple sub-CAPs (S-CAPs), for device-to-device communication with wireless directional transmission.

For communication during a CAP, the devices must first switch their antenna directions to point to each other. As shown by example in FIG. 5, a wireless station DEV1 can send packets to a coordinator during S-CAP3 and a wireless station DEV2 can send packets to the coordinator during S-CAP2. Devices DEV1 and DEV2 must point their antenna directions to one another to communicate with each other during the CAP period.

According to an embodiment of the invention, two devices exchange data with each other in a CAP while other devices can contend the channel simultaneously at the same CAP. Another embodiment involves using a CFP for channel time allocation for two devices to exchange information with each other. The CFP may be shared with other devices through contention access or spatial re-use within the CFP. An implementation of the invention allows multiple pairs of devices to share one CFP for communication.

Figure 6:
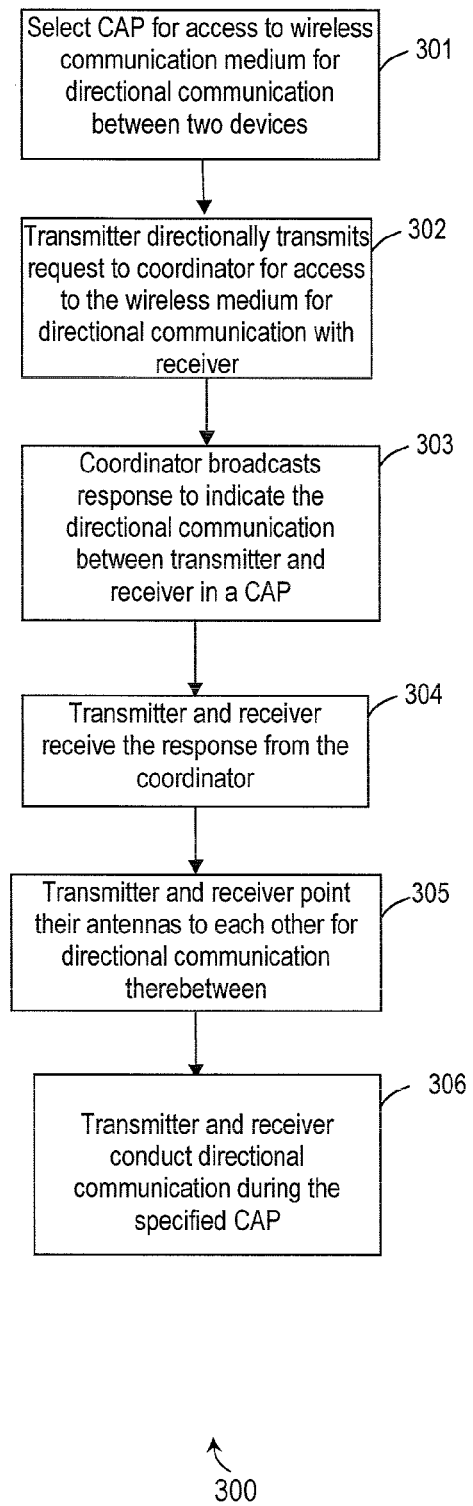
FIG. 6 shows an embodiment of a process for device-to-device communication with wireless directional transmission in contention access periods.

FIG. 6 shows a flowchart of an example process 300 for device-to-device communication with directional transmission in a CAP period, according to an embodiment of the invention, comprising the following processing blocks:

Block 301: Selecting a CAP for access to a shared wireless communication medium (e.g., shared wireless RF channel) for directional communication between two devices.

Block 302: During a sub-CAP in the selected CAP, a first device (e.g., transmitter) directionally transmitting a request to a coordinator for access to the shared wireless medium for directional communication with a second device (e.g., receiver).

Block 303: The coordinator transmitting a broadcast response in a subsequent time frame, the broadcast including an information element (IE) in a beacon indicating that during a specified CAP (e.g., a next CAP) the first and second devices may point their antenna directions to each other (e.g., using beamforming) for directional communication therebetween.

Block 304: The first and second devices receiving the broadcast response from the coordinator indicating that during a next CAP, the first and second devices may set their antenna directions to each other for wireless directional communication therebetween.

Block 305: The first and second devices pointing their antennas to one another for directional communication therebetween during a next CAP as specified in the IE.

Block 306: The first and second devices performing directional communication therebetween during said specified CAP. The two devices can ignore the boundaries of the S-CAPs when they perform directional communication during the CAP.

Transmitting a directional request from a first device to the coordinator for directional communication with another device may comprise: during a sub-CAP in the selected CAP in a current time frame, the first wireless station directionally transmitting a request to a coordinator for directional communication with the second wireless station during a sub-CAP. During a sub-CAP, the second device may transmit a relinquish request to the coordinator, rejecting communication with the first device.

Further example implementations of the invention are described below, which provide support for device-to-device communication with contention-based channel access or spatial re-use for wireless networks with directional transmission. To support device-to-device communication at CAPs, a protocol for devices to switch their antenna directions is provided by the invention.

Before two peer devices communicate in a CAP, the two devices (e.g., source and destination) may perform beamforming if they do not know the antenna directions to point to each other. To support directional peer communication in the CAP, the source device may send the coordinator a notification including a directional peer information element (IE), with a request/release bit set to one. The coordinator may allow directional peer communication, whereby it includes the directional peer IE in the beacon to announce that the two devices may conduct directional peer communication during the CAP.

After the source and destination devices receive the directional peer IE in the beacon from the coordinator, the two devices may switch their antenna directions and communicate with each other in the CAP. After the two devices complete directional peer communication, the source device may send the coordinator a notification including directional peer IE, with the request/release bit set to zero, wherein the coordinator removes the directional peer IE from its beacon.

In one implementation, a device DEV1 transmits a DEV-to-DEV CAP request command to the coordinator (e.g., PNC) during an S-CAP in which DEV1 can reach the coordinator. The coordinator may reply back with a DEV-to-DEV response command. In the next superframe, the beacon broadcast by the coordinator includes a DEV-to-DEV CAP IE for announcing in the CAP of that superframe (and maybe subsequent superframes). If the device DEV2 does not wish DEV-to-DEV communication with DEV1, the DEV2 sends a DEV-to-DEV relinquish request command to the coordinator during an S-CAP, and the coordinator removes the DEV-to-DEV CAP IE from the beacon in the next superframe. The coordinator may not specify the number of superframes for the two devices to point their antennas to each other. Instead, one device sends a DEV-to-DEV relinquish request command to the coordinator after device-to-device communication is completed. If the coordinator desires communication with either DEV1 or DEV2 at a CAP during the reserved DEV-to-DEV superframes, then the coordinator may temporarily remove the DEV-to-DEV CAP IE from a beacon in the superframe during which the coordinator desires to communicate with the two devices. The coordinator later adds back the DEV-to-DEV CAP IE to the beacon in the following superframes.

An example device-to-device communication process in a wireless network with directional transmission according to the invention is described below:

1. To support device-to-device communication at CAPs, a protocol for devices to switch their antenna directions comprises:
   1.1: A DEV sends a DEV-to-DEV CAP request command to the coordinator during its S-CAP that it can reach the coordinator, the coordinator may reply back with a DEV-to-DEV response command.
   1.2: In the next superframe, the beacon broadcast by the coordinator includes a DEV-to-DEV CAP IE to announce that in the CAP of the current superframe and maybe some more superframes, the two devices set their antenna directions to point to each other.
   1.3: If the DEV2 does not want DEV-to-DEV communication with DEV1, during its S-CAP it sends a DEV-to-DEV relinquish request command to the coordinator, and the coordinator removes the DEV-to-DEV CAP IE from the beacon in the next superframe.
   1.4: The coordinator may not specify how many superframes the two devices point their antennas to each other, instead, one device sends DEV-to-DEV relinquish request command to the coordinator after device-to-device communication is finished.
   1.5: If the coordinator desires to communicate to either DEV1 or DEV2 at a CAP during the reserved DEV-to-DEV superframes, the coordinator may temporarily remove the DEV-to-DEV CAP IE from the beacon in the superframe that it wants to communicate with the devices and add back the DEV-to-DEV CAP IE in the following superframes.

Figure 7:
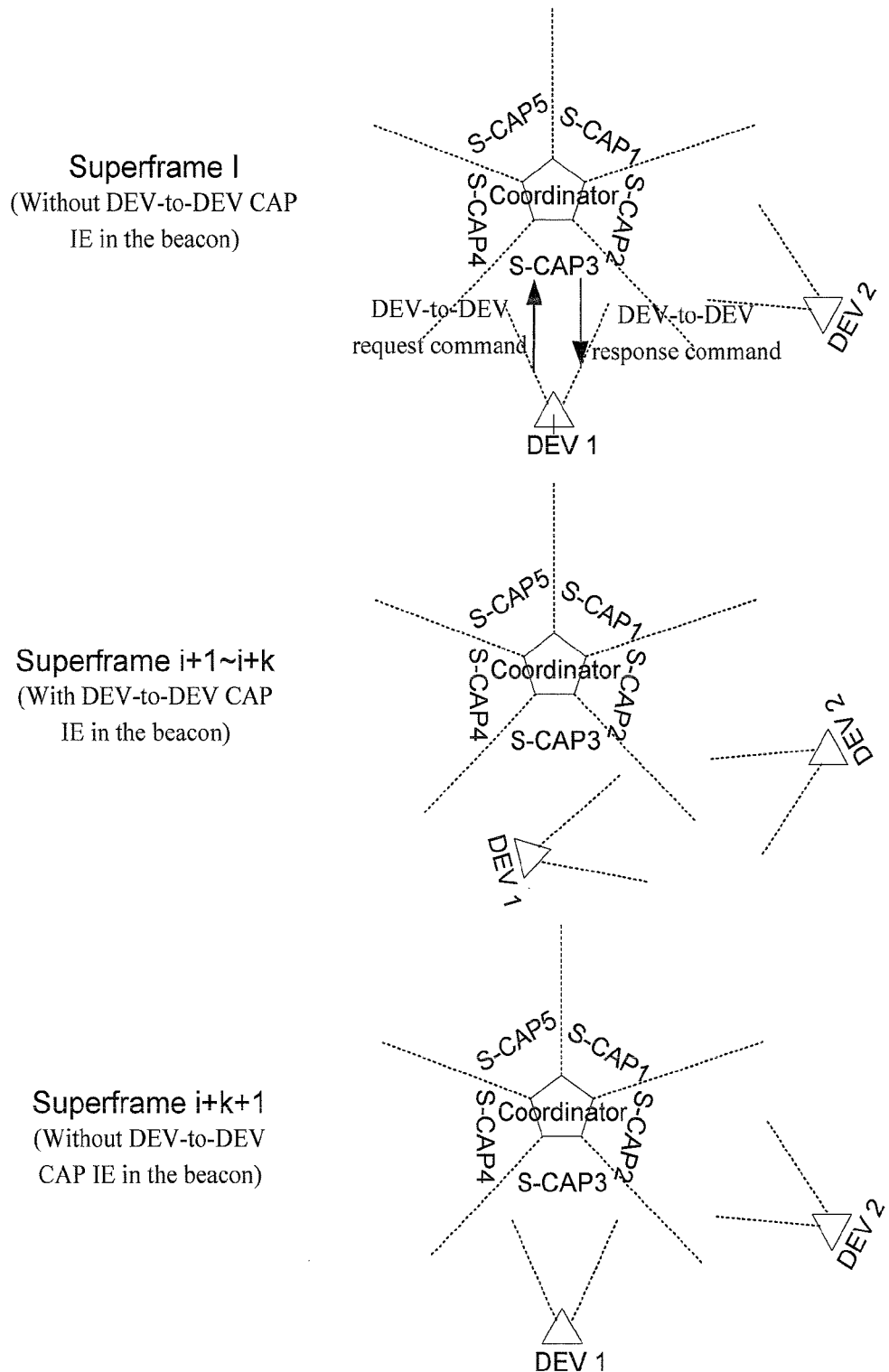
FIG. 7 shows a sequence of operations for device-to-device communication with wireless directional transmission.

FIG. 7 illustrates an example process for the two devices successfully setting up DEV-to-DEV communication at CAPs, according to the invention. Specifically, when one device, DEV1, desires to send packets to another device, DEV2, during CAP, DEV1 sends a DEV-to-DEV CAP request command to the coordinator during an S-CAP that the coordinator is reachable. The DEV-to-DEV request command includes information about the superframe numbers that the device requested to use CAP for DEV-to-DEV communication purpose.

Figure 8:
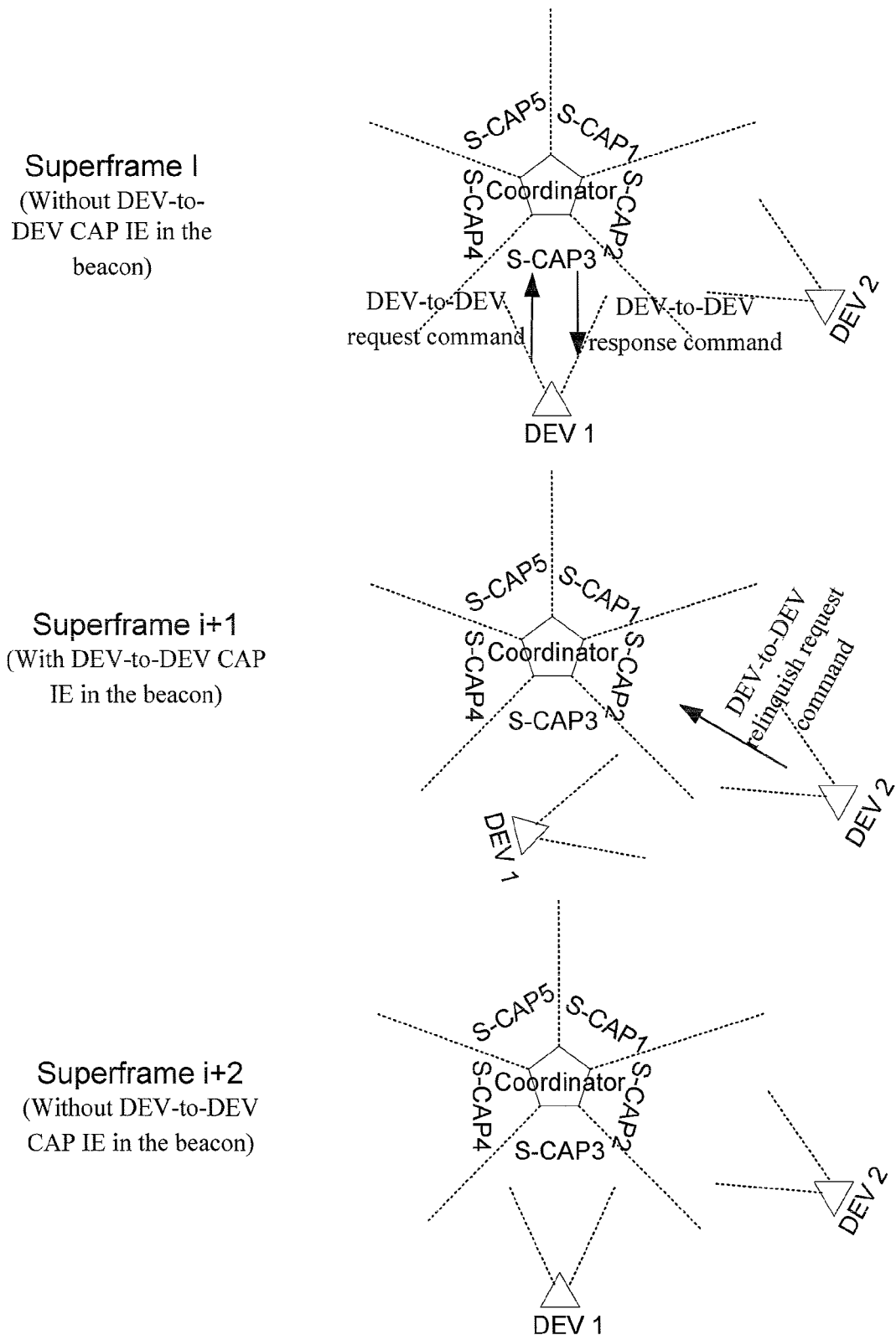
FIG. 8 illustrates an embodiment of communication with wireless directional transmission.

If the coordinator has no data planned to send to the two devices DEV1, DEV2, at CAPs of the requested number of superframes, the coordinator may reply back a DEV-to-DEV response command. In the next superframe, the beacon broadcast by the coordinator includes a DEV-to-DEV CAP IE to announce that in the CAP of the current superframe, and optionally more superframes, the two devices set their antenna directions to point to each other. Referring to the example illustration in FIG. 8, if DEV2 does not desire DEV-to-DEV communication with DEV1, during an S-CAP, DEV2 sends a DEV-to-DEV relinquish request command to the coordinator, and the coordinator removes the DEV-to-DEV CAP IE from the beacon in the next superframe. FIG. 8 illustrates a process wherein DEV2 rejects the DEV-to-DEV communication request from DEV1.

Figure 9:
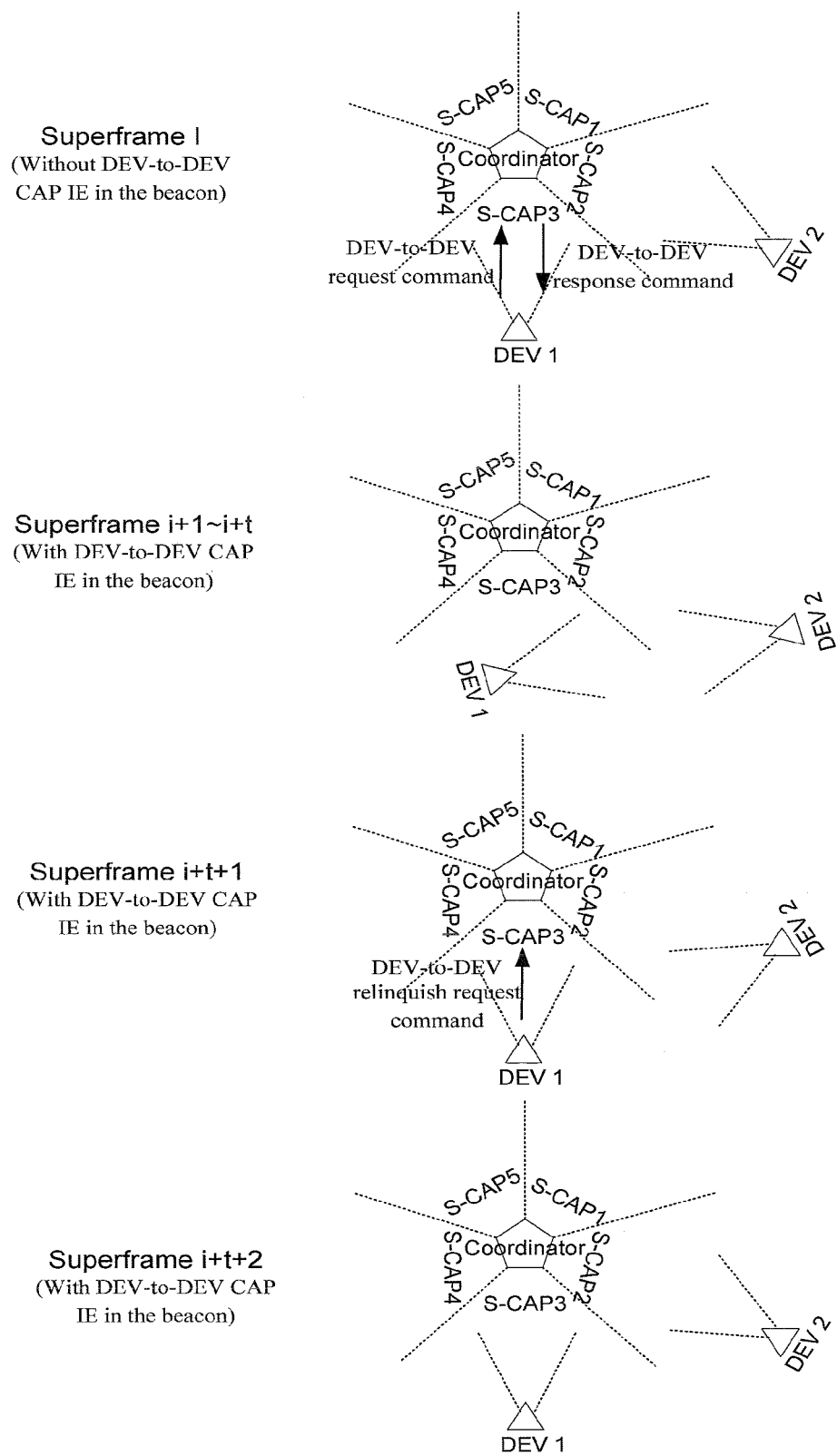
FIG. 9 shows a sequence of operations for device-to-device communication with wireless directional transmission.

If DEV1 is unsure of number of superframes to reserve the CAP for DEV-to-DEV communications, then a DEV-to-DEV CAP request command indicate the superframe number is not decided yet. Then, at the CAPs of the following superframes, the two devices DEV1 and DEV2 set their antenna directions to each other. After the two devices complete DEV-to-DEV communication, DEV1 or DEV2 sends a DEV-to-DEV relinquish request command to the coordinator, and the coordinator removes the DEV-to-DEV CAP IE from the beacon in the next superframe. FIG. 9 illustrates an example process wherein two devices successfully set up DEV-to-DEV communication at CAPs with uncertain superframe numbers. If the coordinator desires to communicate with either DEV1 or DEV2 at a CAP during the reserved DEV-to-DEV superframes, the coordinator may temporarily remove the DEV-to-DEV CAP IE from the beacon of a superframe for communication with the devices, and add back the DEV-to-DEV CAP IE to the beacon in the following superframes.

Accordingly, device-to-device directional communication at CAP is provided above for cases such as random data communications between two devices. Further, device-to-device directional communication can be performed at CFP as described below.

When the device-to-device communication is performed at CFP (i.e., CTAP), three types of channel time allocations may be utilized to improve MAC efficiency, depending on whether multiple pairs of devices desire to have spatial-reuse with or without channel access contention (described further below). An interference avoidance mechanism is utilized to ensure that the two pairs of devices have overlapped CFPs but have no interference. According to the invention, a CFP for a wireless device may overlap with the CFPs allocated for other wireless devices.

Figure 10:
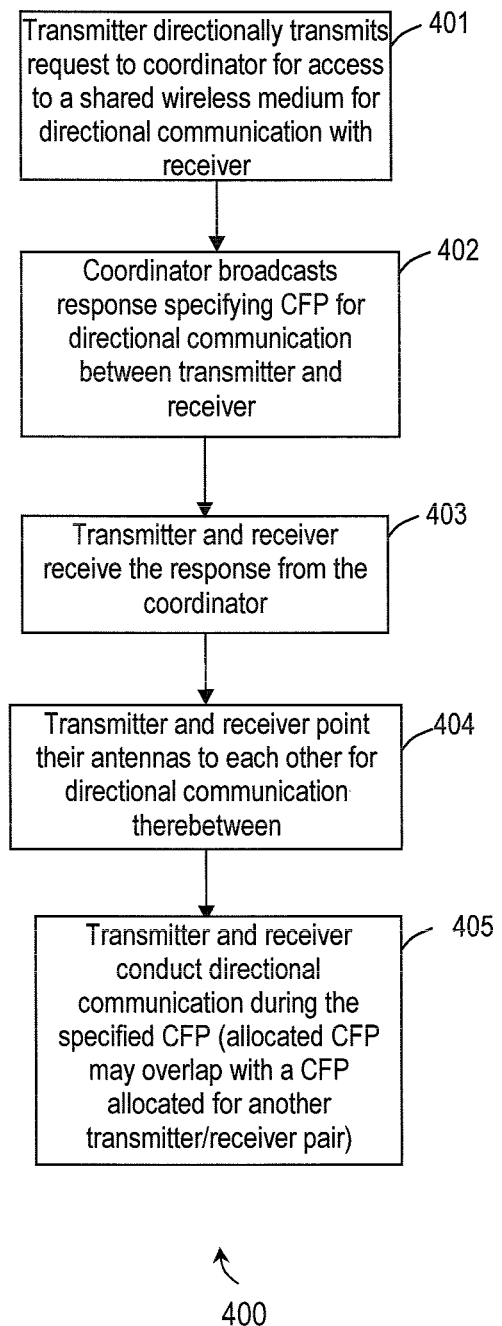
FIG. 10 shows an embodiment of a process for device-to-device communication with wireless directional transmission in contention-free periods.

FIG. 10 shows an example process 400 for directional device-to-device communication at CFP (CTAP) according to an embodiment of the invention, comprising the following processing blocks:

Block 401: A first device (e.g., transmitter) directionally transmitting a request to a coordinator for access to a shared wireless communication medium for directional communication with a second device (e.g., a receiver) during a contention-free access period comprising a channel time allocation (CTA). More than two devices may share the wireless medium during an allocated CFP for directional communication through contention access or spatial re-use within the allocated CFP. In one example, the allocation request from the transmitter may indicate whether an allocated CFP may overlap with another CFP, wherein spatial re-use is permitted in said allocated CFP but contention channel access is not permitted. In another example, the allocation request indicates whether an allocated CFP may overlap with another CFP, wherein spatial re-use and contention channel access are permitted in said allocated CFP.

Block 402: The coordinator transmitting a broadcast response in a subsequent time frame, the broadcast including an IE indicating an allocated CFP in which the first and second devices may point their antenna directions to each other (e.g., using beamforming) for directional communication therebetween. The coordinator allows multiple pairs of devices (or a device and the coordinator) to use the same CFP.

Block 403: The first and second devices receiving the broadcast response from the coordinator indicating that during an allocated CFP, the first and second devices may set their antenna directions to each other for wireless directional communication therebetween.

Block 404: The first and second devices pointing their antennas to each other for directional communication therebetween during the allocated CFP as specified in the IE.

Block 405: The first and second devices performing directional communication therebetween during said allocated CFP. The allocated CFP may overlap with a CFP allocated for another transmitter/receiver pair (described below).

Specifically, the coordinator allows multiple pairs of devices (or a device and the coordinator) to use the same CFP. This can improve MAC efficiency through spatial re-use.

When a device requests a CFP allocation or the coordinator grants a CFP allocation, the device indicates whether the CFP can overlap with other CFPs or use contention access methods or spatial re-use to share with other devices. Three types of CFPs can be allocated depending on the requirement from the applications:

Type 1: Non-overlapped CFP, wherein no spatial re-use is allowed in the CFP, and no contention access is allowed in the CFP.

Type 2: Overlapped but no contention CFP, wherein spatial re-use is allowed in the CFP but no contention channel access is allowed in the CFP.

Type 3: Overlapped and contention CFP, wherein spatial re-use is allowed in this CFP and contention channel access is also allowed in this CFP.

Type 1 CFP may be used for communication applications which have high quality of service (QoS) requirements regarding latency and reliability, without need to share a CFP with other applications. Uncompressed video streaming is an example application to use Type 1CFP.

Type 2 CFP targets similar communication applications, which have high QoS requirements regarding latency and reliability. But the applications can share the CFP with other applications without interference. However, for beamforming antenna configuration, if dynamic beam searching/tracking is allowed in the CFP, interference may occur. Therefore, Type 2 CFP may not be used if dynamic beam searching\tracking is allowed in the same CFP.

Type 3 CFP may be used for applications which have no strict latency requirements and can tolerate packet collision and interference. Data transfer application is an example to use Type 3 CFP. To support Type 3 CFP, an interference avoidance mechanism is utilized in the case of spatial re-use when a Type 3 CFP is allocated.

When two devices (e.g., DEV3 and DEV4) request a Type 2 CFP that overlaps with a Type 2 CFP in which ongoing traffic is transmitted between two other devices (e.g., DEV1 and DEV2), then the coordinator transmits InterferenceDetectionRequest commands to request DEV3 and DEV4 to listen to the wireless channel with their antenna directions pointing to each other at the CFP for DEV1 and DEV2. If no signal is detected or signal strengths detected are below the interference threshold, then the coordinator allocates a temporary CFP for DEV3 and DEV4 to send test data with their antenna directions pointing to each other. Meanwhile, the coordinator requests DEV1 and DEV2 to listen to the channel with their antenna directions pointing to each other during the temporary CFP. If no signal is detected, or signals detected are below the interference threshold by DEV1 and DEV2, the coordinator may grant a Type 2 CFP as requested by DEV3 and DEV4. Upon grant of the requested Type 2 CFP, devices DEV3 and DEV4, and devices DEV1 and DEV2 may implement spatial re-use without interference or contention in overlapping CFPs. Otherwise, they may interfere with each other if their CFPs have overlaps.

The wireless communication medium (e.g., RF channel) may be shared among different wireless stations 102 using Carrier Sense Multiple Access with Collision Avoidance (CSMA/CA) during a CFP.

As such, the invention provides device-to-device communication at CAP and CFP for device-to-device communication (this allows multiple pairs of devices to share the same CFP through contention channel access or spatial re-use without contention).

In one example, the invention is generally implemented in the MAC layer, and the MAC layer instructs the PHY layer to change the antenna directions at transmitter or receiver.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, volatile media and transmission media. Non-volatile media includes, for example, optical or magnetic disks, such as a storage device. Volatile media includes dynamic memory, such as a main memory. Transmission media includes coaxial cables, copper wire and fiber optics, including the wires that comprise a bus. Transmission media can also take the form of acoustic or light waves, such as those generated during radio wave and infrared data communications.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for wireless communication, comprising:
   directionally transmitting a request for access to a shared wireless communication medium, for directional communication between two wireless stations;
   receiving a broadcast response indicating a contention-free access period (CFP) during which the wireless stations perform directional communication therebetween via the wireless communication medium by setting their antenna directions to each other; and
   training antennas of the two wireless stations for determining antenna directions for directional communication with each other;
   wherein channel time is organized into multiple time frames, each time frame comprising a CFP and a contention-based access period (CAP),
   wherein each CAP comprising multiple sub-CAPs each based on a different receiving direction,
   wherein the two wireless stations switch their antenna directions for directional communication with each other during a specified CAP,
   wherein an information element indicates that in a CAP the wireless stations may perform directional communication therebetween, and the information element is included in each time frame until one of the two wireless stations transmits a relinquish request.

2. The method of claim 1 wherein receiving a broadcast response further comprises:
   receiving the broadcast response indicating a contention-based access period (CAP) during which the wireless stations may perform directional communication therebetween via the wireless communication medium by setting their antenna directions to each other.

3. The method of claim 2 wherein:
   directionally transmitting a request for access to a shared wireless communication medium further comprises: during a sub-CAP in a selected CAP, a first wireless station directionally transmitting a request to a coordinator for directional communication with a second wireless station; and
   receiving a broadcast response further comprises: receiving a broadcast response indicating that during a next CAP the wireless stations may set their antenna directions to each other for directional communication therebetween via a wireless channel.

4. The method of claim 3 wherein:
   directionally transmitting a request for access to a shared wireless communication medium, for directional communication between two wireless station further comprises: during a sub-CAP in a selected CAP in a current time frame, the first wireless station directionally transmitting a request to a coordinator for directional communication with the second wireless station during a sub-CAP; and
   the coordinator broadcasting the information element, and the the wireless stations perform directional communication therebetween via the wireless communication medium by setting their antenna directions to each other; and
   receiving a broadcast response further comprises: the first and second wireless stations receiving the broadcast from the coordinator in a subsequent time frame, the broadcast including an information element indicating that in a CAP the wireless stations may set their antenna directions to each other for directional communication therebetween via the wireless channel.

5. The method of claim 4 further comprising:
during a sub-CAP, the second wireless station transmitting the relinquish request to the coordinator, rejecting communication with the first wireless station.

6. The method of claim 1 wherein:
channel time is organized into multiple time frames, each time frame comprising a reservation period;
directionally transmitting a request for access to a shared wireless communication medium, for directional communication between two wireless stations further comprises: directionally transmitting an allocation request to a coordinator for directional communication on a wireless channel between two wireless stations during a reservation period; and
receiving a broadcast response further comprises: receiving a broadcast from the coordinator, the broadcast including the information element indicating that during an allocated channel time period in a reservation period the wireless stations may set their antenna directions to each other for directional communication therebetween via the wireless channel.

7. The method of claim 6 wherein more than two wireless stations may share the wireless channel during an allocated channel time period for directional communication through contention access or spatial re-use within the allocated channel time period.

8. The method of claim 7 wherein the request indicates whether an allocated channel time period may overlap with another channel time period wherein spatial re-use is permitted in said allocated channel time period but contention channel access is not permitted.

9. The method of claim 7 wherein the request indicates whether an allocated channel time period may overlap with another channel time period wherein spatial re-use and contention channel access are permitted in said allocated channel time period.

10. The method of claim 1 further comprising:
the two wireless stations performing directional communication therebetween in the indicated CFP period by setting their antenna directions to each other.

11. The method of claim 10 wherein the wireless communication comprises millimeter wave (mmW) radio frequency communication.

12. The method of claim 11 wherein the wireless communication comprises 60 GHz radio frequency communication.

13. A wireless communication system, comprising:
a transmitting wireless station that directionally transmits a request for access to a shared wireless communication medium, for directional communication with a receiving wireless station; and
a coordinator that broadcasts a response indicating a contention-free access period (CFP) during which the wireless stations may perform directional communication therebetween via the wireless communication medium by setting their antenna directions to each other; wherein antennas of the wireless stations are trained for determining antenna directions for directional communication with each other;
wherein the transmitting and receiving wireless stations receive said broadcast response and perform directional communication therebetween via the wireless communication medium during the indicated period by setting their antenna directions to each other,
wherein channel time is organized into multiple time frames, each time frame comprising a CFP and a contention-based access period (CAP),
wherein each CAP comprising multiple sub-CAPs each based on a different receiving direction,
wherein the wireless stations switch their antenna directions for directional communication with each other during a CAP,
wherein an information element indicates that in a CAP the wireless stations may perform directional communication therebetween, and the information element is included in each time frame until the receiving wireless station transmits a relinquish request.

14. The system of claim 13 wherein the coordinator broadcasts a response indicating that in a CAP the wireless stations may perform directional communication therebetween via the wireless communication medium by setting their antenna directions to each other.

15. The system of claim 14 wherein:
the transmitting wireless station directionally transmits a request to the coordinator during a sub-CAP for directional communication with the receiving wireless station;
the coordinator broadcasting the information element specifying that in a CAP the wireless stations may perform directional communication therebetween via the wireless communication medium by setting their antenna directions to each other; and
the transmitting and receiving wireless stations receive the broadcast from the coordinator in a subsequent time frame, and set their antenna directions to each other for directional communication therebetween via a wireless channel during the specified CAP.

16. The system of claim 13 wherein:
each time frame comprising a reservation period;
the transmitting wireless station directionally transmits an allocation request to a coordinator for directional communication on a wireless channel with the receiving wireless station during a reservation period; and
the coordinator broadcasts a response including the information element, and the wireless stations set their antenna directions to each other for directional communication therebetween via the wireless channel.

17. The system of claim 16 wherein more than two wireless stations may share the wireless channel during an allocated channel time period for directional communication through contention access or spatial re-use within the allocated channel time period.

18. The system of claim 17 wherein the request indicates whether an allocated channel time period may overlap with another channel time period wherein spatial re-use is permitted in said allocated channel time period but contention channel access is not permitted.

19. The system of claim 17 wherein the request indicates whether an allocated channel time period may overlap with another channel time period wherein spatial re-use and contention channel access are permitted in said allocated channel time period.

20. The system of claim 13 wherein wireless communication comprises millimeter wave (mmW) radio frequency communication.

21. The system of claim 13 wherein wireless communication comprises 60 GHz radio frequency communication.

22. The system of claim 13 wherein:
the transmitting wireless station comprises a media access control (MAC) layer and a physical (PHY) layer, the MAC layer configured for station-to-station directional wireless communication by directionally transmitting a request for access to a shared wireless communication medium, for directional communication with the receiving wireless station;

the coordinator comprises a MAC layer and a PHY layer, the MAC layer configured for station-to-station directional wireless communication by broadcasting a response indicating a time period during which the wireless stations may perform directional communication therebetween via the wireless communication medium by setting their antenna directions to each other; and the receiving wireless station comprises a MAC layer and a PHY layer, wherein the MAC layers of the transmitting wireless and receiving wireless stations are configured for station-to-station directional wireless communication by performing directional communication therebetween via the wireless communication medium during the indicated period by setting their antenna directions to each other.

23. A non-transitory computer usable medium having a processor readable program code embodied therewith, wherein the processor readable program code when executed on a processor causes the processor in conjunction with a transceiver of a wireless station to:

directionally transmit a request for access to a shared wireless communication medium, for directional communication with another wireless station;

receive a broadcast response indicating a contention-free access period (CFP) in which the wireless stations may perform directional communication therebetween via the wireless communication medium by setting their antenna directions to each other;

train antennas of the wireless stations for determining antenna directions for directional communication with each other; and perform directional communication with said another wireless station via the wireless communication medium during the indicated period by setting an antenna direction to the another wireless station, wherein channel time is organized into multiple time frames, each time frame comprising a CFP and a contention-based access period (CAP), wherein each CAP comprising multiple sub-CAPs each based on a different receiving direction, wherein the wireless stations switch their antenna directions for directional communication with each other during a CAP, wherein an information element indicates that in a CAP the wireless stations may perform directional communication therebetween, and the information element is included in each time frame until one of the wireless stations transmits a relinquish request.

24. A non-transitory computer usable medium having a processor readable program code embodied therewith, wherein the processor readable program code when executed on a processor causes the processor in conjunction with a transceiver to:

receive a directional transmission comprising a request from wireless transmitter for access to a shared wireless communication medium, for directional communication with a wireless receiver;

broadcast a response indicating a contention-free access period (CFP) during which the transmitter and receiver may perform directional communication therebetween via the wireless communication medium by setting their antenna directions to each other; and train antennas of the transmitter and receiver for determining antenna directions for directional communication with each other;

wherein channel time is organized into multiple time frames, each time frame comprising a CFP and a contention-based access period (CAP), wherein each CAP comprising multiple sub-CAPs each based on a different receiving direction, wherein the transmitter and the receiver switch their antenna directions for directional communication with each other during a CAP, wherein an information element indicates that in a CAP the wireless stations may perform directional communication therebetween, and the information element is included in each time frame until the wireless receiver transmits a relinquish request.

25. A non-transitory computer usable medium having a processor readable program code embodied therewith, wherein the processor readable program code when executed on a processor causes the processor in conjunction with a wireless transceiver to:

receive a broadcast indicating a contention-free access period (CFP) during which the wireless transceiver may perform directional communication with a wireless transmitter via a wireless communication medium, by setting its antenna direction to the wireless transmitter;

train antennas of the wireless transceiver and the wireless transmitter for determining antenna directions for directional communication with each other; and perform directional communication with said wireless transmitter via the wireless communication medium during the indicated CFP by setting its antenna direction to the wireless transmitter, wherein channel time is organized into multiple time frames, each time frame comprising a CFP and a contention-based access period (CAP), wherein each CAP comprising multiple sub-CAPs each based on a different receiving direction, wherein the wireless transceiver and the wireless transmitter switch their antenna directions for directional communication with each other during a CAP, wherein an information element indicates that in a CAP the wireless transceiver and the wireless transmitter may perform directional communication therebetween, and the information element is included in each time frame until the wireless transceiver and the wireless transmitter transmit a relinquish request.

26. The method of claim 1, wherein the different receiving directions of the multiple sub-CAPS comprise different coordinator receiving directions.

27. The method of claim 26, wherein the coordinator receiving directions comprise all pico-network-coordinator (PNC) receiving directions.

28. The method of claim 27, wherein in each sub-CAP a coordinator sets an antenna to a particular direction for receiving communication packets from devices that have an antenna set to point to the coordinator.

29. The method of claim 26, wherein each sub-CAP is separated by a guard time period.

30. The method of claim 1, wherein the two wireless stations exchange data with each other in a CAP on a wireless channel, while other wireless stations contend the same wireless channel simultaneously at the same CAP.

31. The method of claim 1, wherein a CFP is used for channel time allocation for the two wireless stations for exchanging information with each other, wherein the CFP is shared with other wireless stations through contention access or spatial re-use within the CFP.

32. The method of claim 31, wherein multiple pairs of wireless stations share a same CFP for device-to-device communication.

33. The method of claim 26, wherein during a CFP, a pair of wireless stations exchange information with one another, and the CFP is shared with other wireless devices through contention access or spatial re-use within the CFP.

34. The method of claim 1, wherein each of the multiple sub-CAPs comprises a different receiving direction from one another.

35. The method of claim 1, wherein a number of sub-CAPs equals a number of different coordinator antenna receiving directions.

36. The method of claim 1, wherein the two wireless stations switch their antenna directions from a direction towards a coordinator to directions towards each other for directional communication with each other during a CAP.

37. The method of claim 1, wherein the time frame comprises a superframe, and each superframe marks a channel time period between a pair of successive beacons.

38. The method of claim 37, wherein each beacon includes multiple beacon packets separated by guard time (GT) periods.

39. The method of claim 1, wherein a coordinator communicates with a particular one of the two wireless stations during a CAP, the coordinator temporarily removes the information element from one or more time frames.

40. The method of claim 39, wherein the coordinator adds the information element back to one or more time frames after terminating communication with the particular one of the two wireless stations.

* * * * *